United States Patent [19]

Hartai

[11] Patent Number: 5,561,349
[45] Date of Patent: Oct. 1, 1996

[54] FREQUENCY-MODULATED CONVERTER WITH A SERIES-PARALLEL RESONANCE

[76] Inventor: Julius Hartai, Betzy Kielsbergs vei 232 C, N-3028 Drammen, Norway

[21] Appl. No.: 199,212
[22] PCT Filed: Aug. 25, 1992
[86] PCT No.: PCT/NO92/00133
§ 371 Date: Feb. 28, 1994
§ 102(e) Date: Apr. 26, 1994
[87] PCT Pub. No.: WO93/04570
PCT Pub. Date: Mar. 4, 1993

[30] Foreign Application Priority Data

Aug. 27, 1991 [NO] Norway ................................. 913368

[51] Int. Cl.$^6$ .................................................. H05B 37/00
[52] U.S. Cl. ..................... 315/209 R; 315/219; 315/222; 315/223; 315/206
[58] Field of Search ................. 315/209 R, 219, 315/222, 223, 206

[56] References Cited

U.S. PATENT DOCUMENTS 4,613,796  9/1986  Bay ........................................... 315/219

Primary Examiner—Frank Gonzalez
Assistant Examiner—Reginald A. Ratliff
Attorney, Agent, or Firm—McAulay Fisher Nissen Goldberg & Kiel, LLP

[57] ABSTRACT

A frequency-modulated converter with a series-parallel resonance, particularly for driving any ohmic or inductive load, including gas discharge tubes, wherein a commutating voltage switch in the form of a transistor is provided and is connected in series between a negative electrode of a direct current voltage source and a first terminal of an inductor, and a pulse generator circuit is provided between the voltage source and the transistor's control electrode and the inductor's second terminal is connected to the primary winding of a transformer.

A first capacitor and rectifier diode are also provided in a first and second parallel branch respectively between the transistor's charge receiving and charge emitting electrodes, and a second capacitor is provided across the voltage source's electrodes, and a smoothing capacitance is provided for the voltage source, the second capacitor being connected in series with the inductor via the diode.

20 Claims, 6 Drawing Sheets

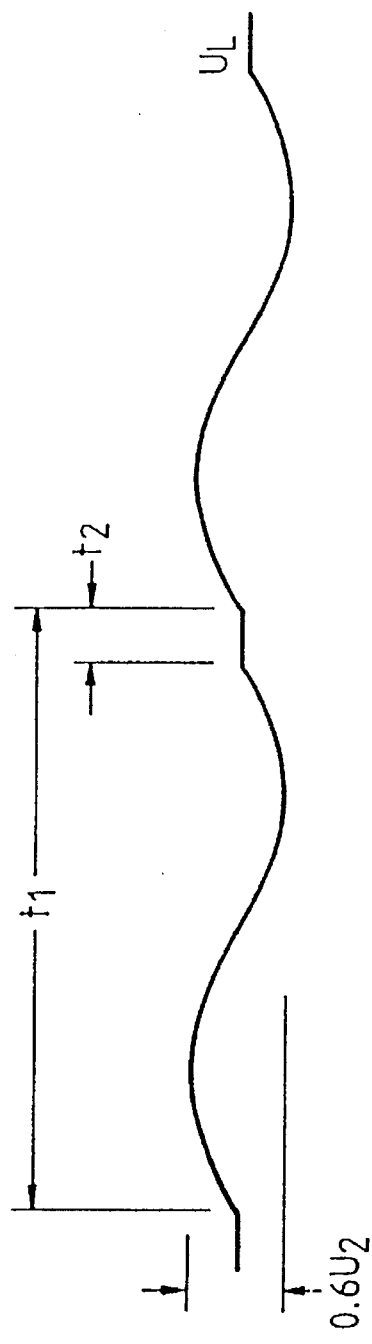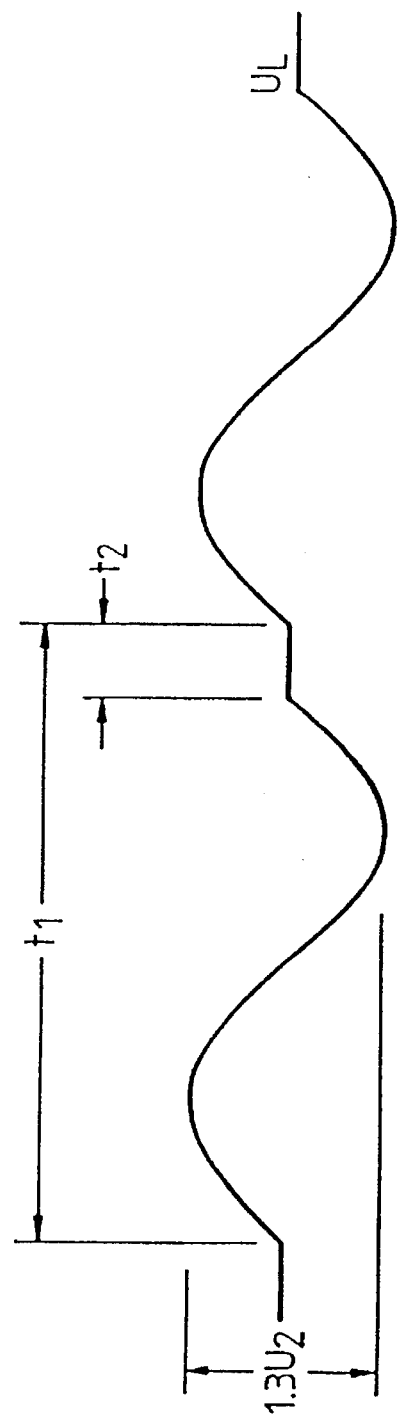

Fig. 6a.
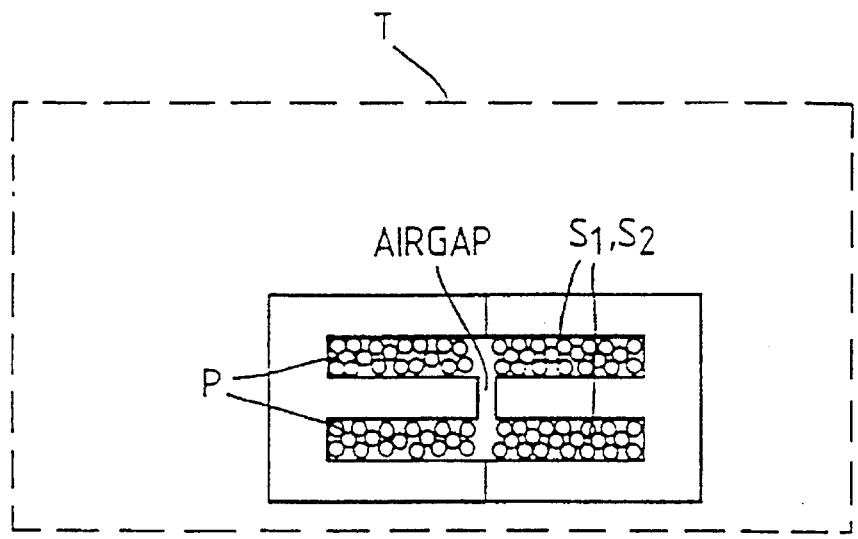
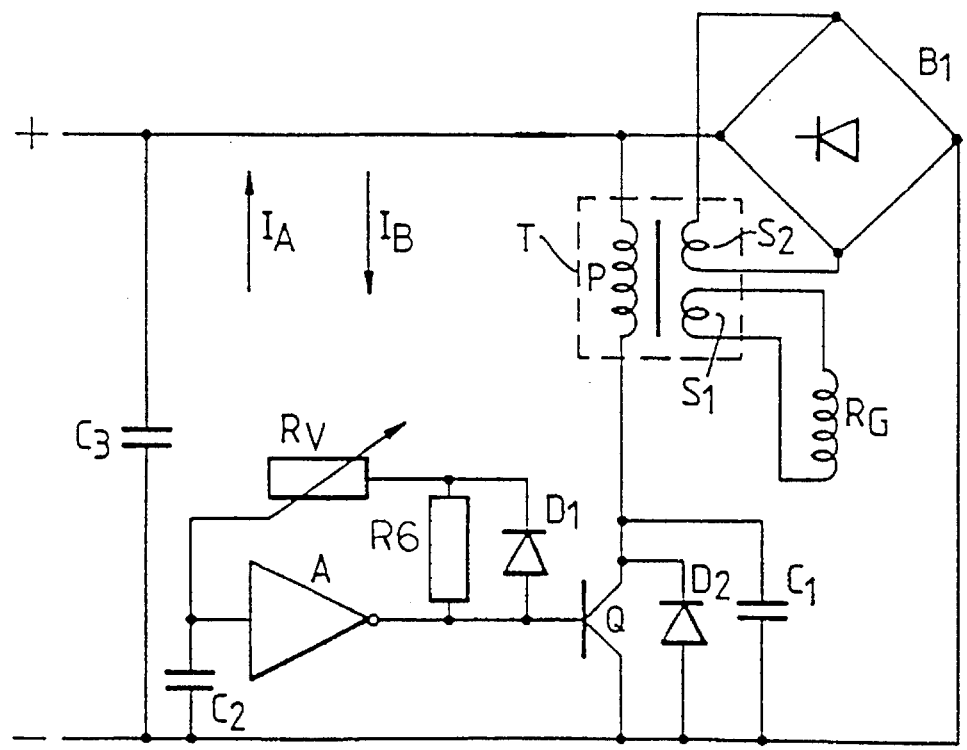
Fig. 6.

FREQUENCY-MODULATED CONVERTER WITH A SERIES-PARALLEL RESONANCE

The invention concerns a frequency modulated converter with a series-parallel resonance, particularly for driving any ohmic or inductive load, including gas discharge tubes, wherein a commutating voltage switch in the form of a transistor is provided and in connected in series between the negative electrode of a direct current voltage source and a first terminal of an inductor, wherein a pulse generator circuit is provided between the voltage source and a control electrode of the transistor and wherein a second terminal of the inductor is connected to the primary winding of a transformer.

The invention further comprises a first capacitor and a rectifier diode provided in a first and second parallel branch respectively between the charge emitting and the charge receiving electrode of the transistor, and a second capacitor is provided across the electrodes of the voltage source and additionally provides a smoothing capacitance for the voltage source, the second capacitor being connected in series with the inductor via the diode.

The later years have seen a dramatic reduction in the physical dimensions of power converters, something which has been achieved by increasing the operating frequencies. Common quasi-square pulse converters now approach an operating range whose upper limit lies about 0.5 MHz. This allows a significant reduction in the size of the most important passive power components such as the magnetic components and the capacitors, compared to for instance with switches for 20 kHz. However, these converters, being for the greater part pulse width modulated converters, have high switching losses in the power semiconductors, something which leads to reduced efficiency and hence a need for more cooling, which decreases the possibilities of a reduction in the physical dimensions of the converters.

In order to increase the capability of power converters to handle overloads or large load varations, for instance when used as power supplies for gas discharge tubes, there has been proposed to monitor or avoid saturation of the switching transistors by special circuit arrangements, as will be evident from for instance PCT application NO WO 90/01248 and GB-PS-No. 1 378 465.

A more effective way of converting power at increasingly higher frequencies is based on the so-called "zero current switching" wherein a sinusoidal voltage which may be generated by a LC-resonant tank connected either in parallel or series, is used. Such converters are called "resonant converters". The advantage of using a sine voltage is that losses in the power semiconductors are dramatically reduced, as the switching generally takes place at the zero crossing. The disadvantage of resonant converters is that at a given power level the peak current is many times greater than that of a pulse width modulated converter. By using semiconductors with lower resistance in conduction it is however possible to increase the operating frequencies to above 1 MHz. Thus power densities well beyond 1 W/cm³ may be attained.

For use in such converters there is now known a frequency modulated control in the form of an integrated circuit which may be used in the range beyond 1 MHz, with the designation LD 405, obtainable from Gennum Corporation, Burlington, Ontario, Canada. The use of this control circuit in a frequency modulated converter is described in a LD 405 application note from Gennum Corporation with the title "Using LD 405 in a 125 W resonant mode power supply". To this end the same corporation has introduced a resonant circuit of which the embodiment in principle is shown in the appended FIG. 1. The circuit comprises an inductance L, a capacitance C, a resistance R and a load $R_L$. Before the inductance L a commutating switch S, for instance in the form of a transistor, has been provided its purpose is to supply direct current from a source V to a series resonant tank LC. The resistance of the load $R_L$ drains current from the tank. As soon as the resonant process has been terminated, the switch S opens and the power conversion from the source S to the load $R_L$ is interrupted. After a given period of Lime the switch S again closes and the process is repeated. The commutation frequency may be changed such that the average power dissipated in the load $R_L$ is changed.

In a practical embodiment a resonant converter of this type works with two commutating switches each of which handles a respective half-cycle of the resonant period. The switches are based on MOS field effect transistors which themselves are driven by a respective MOSFET stage. The output stage of the shown embodiment is based on Schottky rectifier diodes.

However, with this prior art embodiment of the resonant converter it is difficult wholly to avoid harmonics in the resonant voltage and it is also difficult to symmetrisize the half-cycles such that they get the same energy content. Finally there will still be substantial losses in the power switches and the Schottky output diodes. Beyond this RC networks have been provided across the power switches in order to dampen voltage transients and these damping circuits lead to additional losses. Hence the efficiency is reduced by at least 25% and even if an output stage without rectifying diodes is used, the loss will be around 16%.

Generally it can be said of converters as discussed above and prior art devices of the same type that the capacitor is connected in direct parallel with the inductor and the switch in series with the voltage supply. In addition the load will steal energy from the resonant circuit which also may be made as a transformer. These prior art devices are generally difficult to compute and realize due to the limitation in the energy content of the resonance. If too much energy is drained from the LC circuit, the frequency changes and it is necessary with complicated electronic control means in order to control the switching of the commutating switches such that the resonant state of the circuit is maintained. If overload arises in such circuits, the switching current of the transistor increases uncontrollably and if the transistors are disconnected, this may lead to transients which incur irrepearable damage to the converter. The problem is that the control means which is to protect the transistor, does not work in real time and hence the transistor, i.e. the switch, is exposed to non-normal loads. As already mentioned the substantial losses are still present, such that the efficiency of the converter does not attain more than about 84% without the use of a rectified output.

Finally U.S. Pat. No. 4,613,769 discloses a transistor oscillator circuit wherein a capacitor is connected in parallel over the terminals of a secondary winding in a transformer, the latter operating in parallel sine wave resonance with the capacitor as a first wave-shaping means at a given frequency. A second wave-shaping means consists of another capacitor connected in parallel over the collector and emitter electrodes of the transistor oscillator and operates in series resonance with an inductor, at twice the given frequency.

The object of the present invention is to provide a resonant circuit without the above-mentioned and other disadvantages. This is achieved according to the invention in that the first capacitor and the inductor together form a series resonance circuit, the relationship between the inductor voltage $U_L$ and the capacitance of the first capacitor determining the series resonance frequency of a first half-cycle, that the second capacitor and the diode together form a parallel resonance circuit, the inductor voltage $U_L$ and the capacitance of a second capacitor determining the parallel resonance frequency of a second half-cycle, that the transistor is in a high ohmic state during both the series and parallel resonance mode, that the diode acting as an impedance selector between the capacitors to maintain the correct current flow in the transformer and the load is conducting in the parallel resonance mode, charging the capacitor above the voltage source level, before the transistor is switched into a low ohmic state and completes that parallel resonance mode and then initiates another series-parallel resonance when switched into the high ohmic state, each half-cycle of the resonant period being kept in time of the switching of the transistor into the high ohmic state, the transformer, the inductor and the capacitors thus constituting an RCL resonator operating in series-parallel to the transistor, the quality factor of the resonator being determined by the relationship between the inductor voltage $U_L$ and the capacitor impedances $Z_{C1}$ and $Z_{C2}$ respectively and the supply voltage $U_L$, and that the load is connected between the terminals of a first secondary winding in the transformer, such that the load is connected in series with the inductor consuming energy in each half cycle of the resonance period from both the inductor and the direct voltage source, the transistor thus operating as a commutating voltage switch in series with the voltage source in the first half-cycle and in parallel with the voltage source in the second half-cycle, all the time carrying a fraction of the total energy consumed by the load.

To these ends, the present invention also consists of a frequency-modulated converter with series-parallel resonance, particularly for driving any ohmic or inductive load ($R_G$), including gas discharge tubes, wherein a commutating voltage switch (Q) in the form of a transistor is connected in series between the negative electrode of a direct voltage source and a first terminal of an inductor (L,P), wherein a pulse generator circuit is provided between the voltage source and a control electrode of the transistor (Q) with a transformer (T), and further comprises: a first capacitor ($C_1$) and a rectifier diode ($D_2$) provided in a first and second parallel branch respectively between the charge emitting and the charge receiving electrode of the transistor (Q); a second capacitor ($C_3$) provided across the electrodes of the voltage source, the second capacitor ($C_3$) being connected in series with the inductor (L) via the diode ($D_2$); the first capacitor ($C_1$) and the inductor (L) together forming a series resonance circuit, the relationship between the inductor voltage $U_L$ and the capacitance of the first capacitor ($C_3$) determining the series resonance frequency of a first half-cycle; the second capacitor ($C_3$) and the inductor L together forming a parallel resonance circuit, the relationship between inductor voltage $U_L$ and the capacitance of the second capacitor ($C_3$) determining the parallel resonance frequency of a second half-cycle, the capacitor ($C_3$) having a capacitance which is several times greater than that of the capacitor ($C_1$), that the transistor (Q) is in a high ohmic state during both the series and parallel resonance mode; the diode ($D_2$) acting as an impedance selector between the capacitors ($C_1$, $C_3$) to maintain the correct current flow in the transformer (T) and the load ($R_G$) is conducting in the parallel resonance mode, charging the capacitor ($C_3$) above the voltage source level, before the transistor (Q)is switched into a low ohmic state and completes the parallel resonance mode and then initiates another series-parallel resonance when switched into the high ohmic state, each half-cycle of the resonant period being kept in time by the switching of the transistor (Q) into the high ohmic state, the transformer (T), the inductor (L), and the capacitors ($C_1$, $C_3$) thus constituting an RCL resonator operating in series-parallel to the transistor (Q), the quality factor of the resonator being determined by the relationship between the inductor voltage $U_L$ and the capacitor impedances $Z_{C1}$ and $Z_{C3}$ respectively and the supply voltage U, and the load ($R_G$) being connected between the terminals of a first secondary winding ($S_1$) in the transformer (T), such that the load ($R_G$) is connected in series with the inductor (L,P) consuming energy in each half-cycle of the resonance period from both the conductor and the direct voltage source, the transistor (Q) thus operating as a commutating voltage switch in series with the voltage source in the first half-cycle and in parallel with the voltage source in the second half-cycle, all the time carrying a fraction of the total energy consumed by the load ($R_G$). Further features and advantages are evident from the appended dependent claims.

The invention shall now be discussed in greater detail below with reference to the appended drawing.

FIGS. 4 a–c show respectively the voltage curve measured across the inductor of the converter at normal load on the output, at short-circuited output as well as a cycle of the resonant voltages under different conduction states and load conditions.

Figure 5:
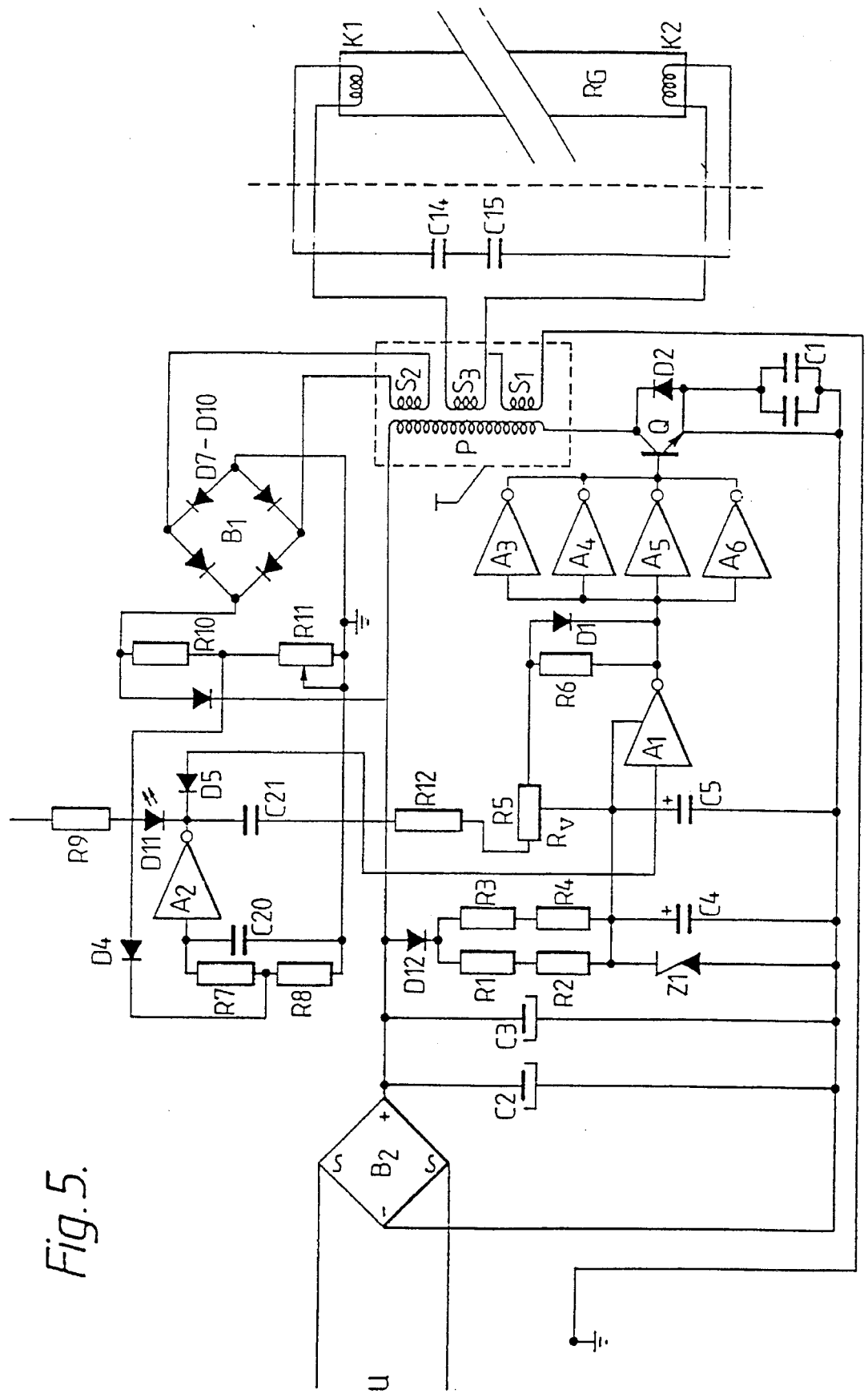

FIG. 5 shows a practical embodiment of the frequency modulated converter according to the invention and applied to driving a hoe cathode gas discharge tube.

Figure 1:
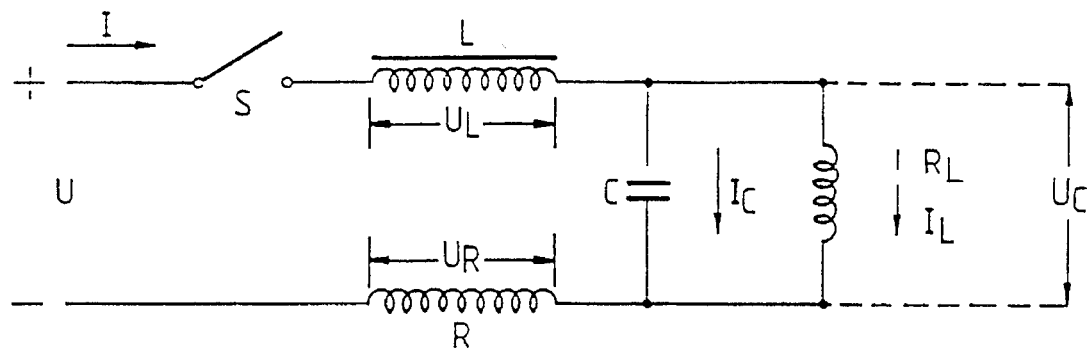
FIG. 1 shows as already mentioned, the basic circuit of a parallel resonator according to prior art.
Figure 2:
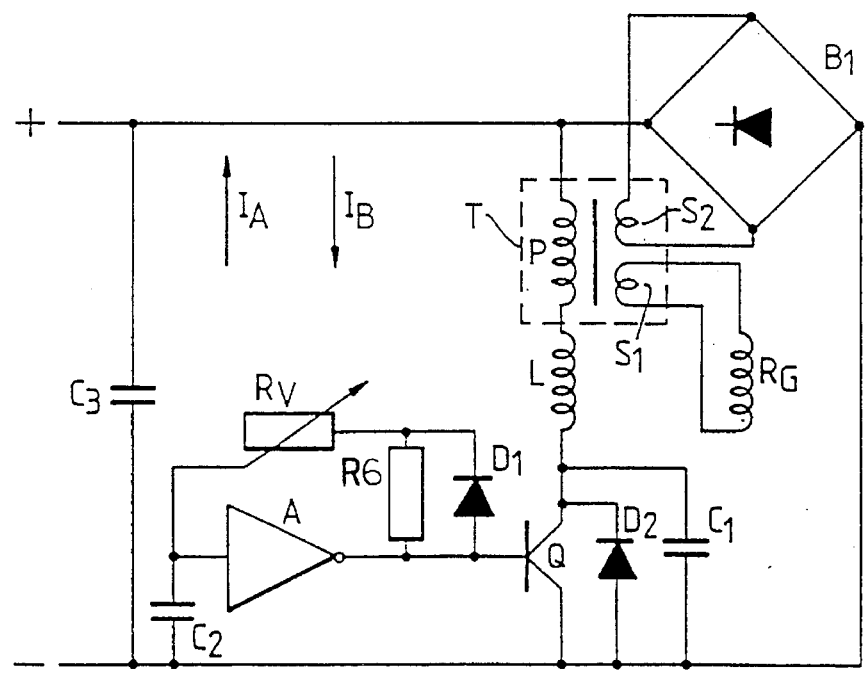
FIG. 2 shows the basic circuit of a modulated converter with series-parallel resonance according to the present invention and used with a cold cathode gas discharge tube.

FIG. 6 shows a practical embodiment of the transformer in as provided in the circuit of FIG. 2 and FIG. 6a shows the transformer T in greater detail.

In FIG. 2 a first resonant capacitor $C_1$ is provided in parallel across the charge emitting and the charge receiving electrode of a transistor Q which operates as a commutating switch. The load $R_G$ is provided in series with an inductor L which is connected to the transistor Q and the capacitor $C_1$ respectively. A second resonant capacitor $C_3$ is provided across the electrode of the voltage source and connected to the inductor L over a diode $D_2$, the diode $D_2$ being connected in a further parallel branch between the charge emitting and the charge receiving electrode of the transistor Q. Further the primary winding P of a transformer T is connected to the inductor L, such that the transformer T, the inductor L and the capacitors $C_1$, $C_3$ provide a RCL resonator operating in series parallel to the transistor Q and with a quality factor which as well-known is determined by the relationship between the inductor voltage $U_L$ or the capacitor voltages $U_{C1}$ and $U_{C3}$ and the supply voltage U. The load $R_G$ is connected between the terminals of a first secondary winding $S_1$ of the transformer T and hence as mentioned is connected in series with the inductor L. The dimensioning of the resonator may advantageously be done on basis of the apparent power requirement, such that the resonator or the resonant tank is dimensioned for an apparent power which is 30% larger than that which is required at the chosen operating frequency of the resonator. The transistor Q is controlled at a determined frequency which need not vary in dependence of the load.

The operation of the converter according to the invention shall now be explained in more detail. The transistor Q is controlled by an approximate square pulse. When the transistor conducts, current flows through the inductor L and the transformer T such that these are magnetized. The inductor L is made with a coil and a core, e.g. of ferrite with an air gap. When the transistor Q has ceased conducting, the counterinduction of the inductor L causes the capacitors $C_1$ or $C_3$ to be charged. The capacitor $C_3$ has however a capacitance which is far greater than the capacitance of the capacitor $C_1$ and will also be charged with the opposite polarity. The transformer T is now fed with current of the same polarity as the current received over the transistor Q. When the voltage of the capacitor $C_1$ reaches a maximum value, the direction of the current is reversed and the capacitor $C_1$ discharges against the inductor L and the transformer T. Thereafter the direction of the current again is reversed and the inductor L discharges the energy over the diode $D_2$ and the transformer T to the capacitor $C_3$. The transistor Q again becomes conducting and the process is repeated.

The process may be described as consisting of 4 phases. In phase 1 the transistor Q is conducting and the current flows in the direction $I_A$ through the transformer T. In phase 2 the transistor has ceased conducting but due to the fact that the inductor L works as "tank", current still is flowing in the direction $I_A$ (FIG. 2) through the transformer T, while the capacitor $C_1$ at the same time is charged due to the counterinduction of the inductor L. In phase 3 the counterinduction from the inductor L has ceased and the capacitor $C_1$ is discharged such that the current flows to the capacitor $C_3$ and through the transformer T in the direction $I_B$ (FIG. 2), while the inductor L is "filled". In phase 4 the inductor L then is "emptied" via the diode $D_2$ and the capacitor $C_3$ as well as the transformer T until the transistor Q again becomes conducting.

It should be remarked that the transistor Q may be switched each time the diode $D_2$ conducts and hence also at "zero" current and voltage. The negative counterinduction voltage $U_L$, from the inductor L adds to the supply voltage U and is applied over the primary winding P of the transformer T, while the capacitor $C_3$ is discharged by both U and $U_L$.

Discharging energy from the secondary winding $S_1$ the load $R_G$ does not take place in the same phase as in the primary winding P and hence only a part of the resonant energy might be used. This would provide an excellent relationship between the current and the voltage if the converter according to the invention is used in gas discharge lamps generally.

As the transistor Q only operates as a refiller of energy which is fed to the transformer T and due to the phase shift, the diode $D_2$ already will relieve the transistor at the moment it again is switched on in the above-mentioned phase 4. Hence the converter according to the invention attains a very high efficiency. The switching losses are completely eliminated, as the transistor switches on in the negative phase of the resonance when the diode $D_2$ conducts, and when the transistor Q is disconnected, the voltage supply is taken over by the capacitor $C_1$. The transistor Q hence works only with the voltage which is necessary to maintain the behavior of the induction curve of the inductor L.

If the first secondary winding $S_1$ is short-circuited, the impedance of the transformer T decreases to zero and the phase shift between the inductor L and the transformer T ceases. All energy is then used for maintaining the resonance and the energy consumption of the converter is reduced to "zero". That is to say that the converter is safe against short-circuiting in any respect.

If the load $R_G$ on the secondary winding $S_1$ is removed, the impedance of the transformer will increase and the frequency drop then leads to an increased current consumption because the transistor Q is switched on at the wrong time. In order to prevent this, a second secondary winding $S_2$ is used in the transformer and connected with a rectifier bridge in order to return a part of the energy to respectively the positive and negative electrode of the voltage source. In this way there is always a certain minimum impedance in the transformer T. The resonator will then operate within the given frequency range and the energy will circulate between the source of the supply voltage and the secondary winding $S_2$ via the rectifier bridge as shown in FIG. 2.

By correct voltage dimensioning of the secondary winding $S_2$ the free-running losses may be minimized and it is possible to provide a detector (not shown) which warns about possible faults of the load $R_G$, for instance a faulty gas discharge tube, in order to disconnect the pulse generator circuit which is connected to the control electrode of the transistor Q. Hence the transistor Q ceases refilling the resonator.

Figure 3:
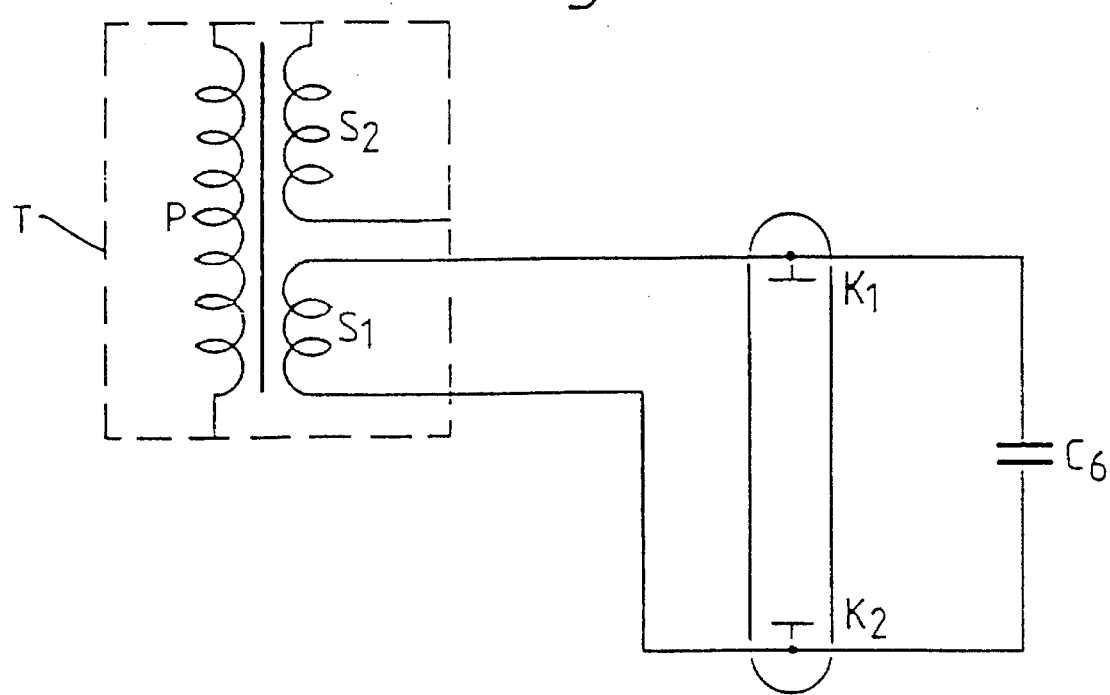
FIG. 3 shows a section of a variant of the converter of FIG. 2 used with a hot cathode gas discharge tube.

If a hot cathode gas discharge tube is used as a load on the secondary side of the transformer T, this can simply be done as shown in FIG. 3 by connecting the terminals of the secondary winding $S_1$ with at least one capacitor $C_6$ over the electrodes $K_1$, $K_2$ in the gas discharge tube.

As known, gas discharge tubes with hot cathodes must be started by means of a preheating of the electrodes in order to achieve sufficient ionization of the gas in the tube and that a discharge may take place. This is achieved by the secondary winding $S_1$ and the capacitor $C_6$ being adapted to the resonance frequency of the transformer T with the cathodes $K_1$, $K_2$ in heated condition. Such an adaption may be determined empirically or by the heat resistance of the cathode being measured and added to the impedance. As long as the cathodes $K_1$, $K_2$ are not sufficiently heated, the impedance is too low and the greater part of the current from the secondary winding $S_1$ is used for heating the cathodes. Only when the condition for resonance is present, the voltage increases to a level which ignites the electrodes. When the discharge between the electrodes $K_1$, $K_2$ is established, the capacitor $C_6$ no longer operates as a resonant capacitor, but nevertheless contributes with a certain glow voltage which keeps the electrodes heated due to the impedance of the former being low compared with the frequency. This is moreover an advantage if dimming is used by reducing the supply voltage.

The converter according to the invention may also be used with a pulsating direct current without smoothing for direct driving of gas discharge tubes with a power factor cos φ up to 0.95 and without use of phase compensation, as the new European norms require. If the frequency 60 kHz, the capacitor $C_1$ is for instance dimensioned to 0.005 µF and the capacitor $C_3$ to 0.22 µF, but at 100 kHz the capacitor $C_1$ is selected with 0.003 µF and the capacitor $C_3$ with 0.15 µF. The wavelength consideration of the transport of cathode material between the electrodes moreover indicates that an operating frequency of 30–35 kHz is an optimum with the present length of gas discharge tubes.

Figure 4C:
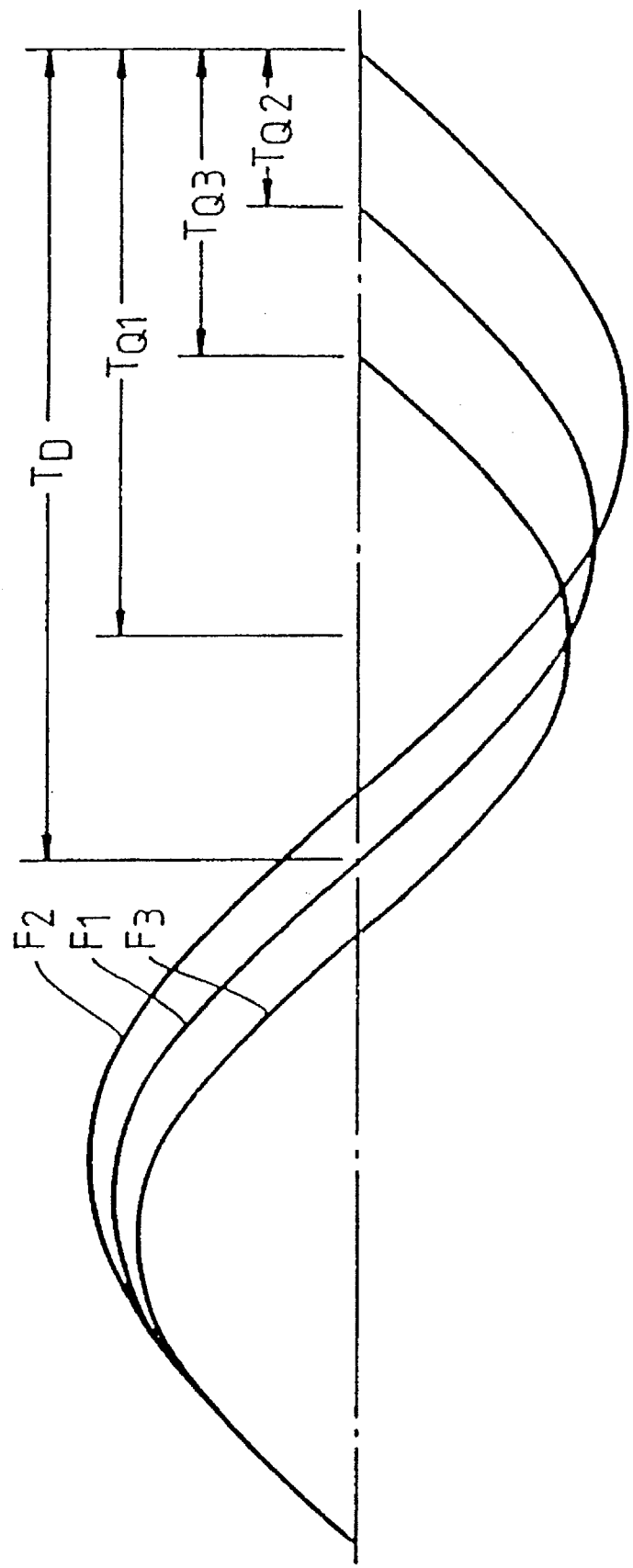

How the converter according to the invention operates in practice will easily be comprehended by considering FIGS. 4a–c.

FIGS. 4a and 4b show the behavior of the inductor voltage $U_L$ measured across the terminals of the inductor L. The voltage in the FIGS. 4a and 4b is referred to an average peak-to-peak value $U_L$. In FIGS. 4a and 4b the total period of the voltage is pulse $t_1$, while the transistor conducts in $t_2$. In FIG. 4a the load on the secondary winding $S_1$ is normal, the voltage is low (here 0.6 $U_L$) and $t_1$ short (here 0.15 $t_1$) due to the energy drain. In FIG. 4b the secondary winding is short-circuited. The voltage increases (here to 1.3 $U_L$) and the same does $t_2$ because the energy drain has ceased.

FIG. 4c shows a period of the resonant voltage under different load conditions. The normal sinusoidal behaviour is denoted by $F_1$. The curve $F_2$ is present when the transformer T "steals" energy and the curve $F_3$ when the secondary winding $S_1$ is short-circuited. The free-running diode conducts all the time in the negative half-cycle, i.e. in the period $T_D$. Whatever the load condition, the transistor Q conducts in the period $T_{Q1}$. If the energy is drained over the transformer T, the transistor Q operates in the period $T_{Q2}$, as the system is self-controlling. If the secondary winding $S_1$ is short-circuited, the transistor Q conducts in the period $T_{Q3}$, energy is no longer drained to the transformer T and in the negative half-cycle the inductor L delivers the greater part of the energy back to the capacitor $C_3$.

A practical embodiment of the frequency modulated converter according to the invention shall now be described with reference to FIG. 5. In this connection it muse be understood that FIGS. 2 and 3 show somewhat more fundamental embodiments of the converter according to the invention.

As can be seen in FIG. 5, a rectifier bridge $B_2$ delivers DC voltage from an AC source, and this voltage is smoothed in the capacitors $C_2$ and $C_3$. The diode $D_{12}$ supplies a pulse generator circuit which in the embodiment shown comprises a bistable multivibrator in the form of a Schmitt trigger circuit with inverted outputs made up by six gates $A_1$–$A_6$. The voltage of the pulse generator circuit is regulated by the zener diode $Z_1$ and smoothed by the capacitor $C_4$. In the embodiment shown the pulse generator circuit provides an astable multivibrator circuit over the resistor $R_6$ and the diode $D_1$ as well the variable resistance $R_V$ ($R_5$) such that there is provided a tuning of the basic frequency and pulse width to the desired value via the resistors $R_V$ and $R_6$ and the capacitor $C_5$. The output of the gate $A_1$ delivers an approximate square pulse and controls the inputs of the four gates $A_3$–$A_6$ in approximate parallel. The respective outputs of the same gates are also connected in parallel and to the control electrode of the transistor Q which is used as a switch. If a common bipolar transistor is used, the control input is of course the basis of the transistor, but if a MOS field effect transistor is used instead, the control. electrode is of course identical to the gate electrode. Advantageously the converter according to the invention may be realized with an integral free-running diode, such that the rectifier diode $D_2$ and the second parallel branch in FIG. 2 are dropped.

When the transistor Q conducts, excitation current is transported to the inductor L and the primary P in the transformer T and the resonance process is initiated. The resonance frequency may be finely tuned over the variable resistance $R_V$.

The secondary winding $S_1$ of the transformer T delivers voltage and current to the provided load as discussed in more detail in connection with FIG. 2. In FIG. 5 there is further provided a third secondary winding $S_3$ in the transformer T. It is used for increasing the ionization voltage of the load if the latter is a gas discharge tube in order to provide safer ignition at extremely low temperatures, as its first terminal is connected with the electrodes of the gas discharge tube and its second terminal is led to the ground as shown.

The transformer T is in a practical embodiment realized as E-core transformers, as shown in detail in FIG. 6. For high frequency purposes, i.e. i the MHz range, the cores and windings may be made for instance in the form of ferrite strips with a dielectric film and the windings deposited thereon. However, the E-core transformers used in non-conventional applications, e.g. for a frequency of 30–100 kHz, still allow a very compact construction. Further, as shown in the embodiment in FIG. 5, the inductor L is integrated with the primary winding p of the transformer T.

The secondary winding $S_2$, which is connected to the rectifier bridge $B_1$, is dimensioned such that a direct voltage is obtained over the rectifier diodes $D_7$–$D_{10}$ in the bridge $B_1$, the voltage being lower than the voltage across $C_2$ and $C_3$ in normal operation. The resistors $R_{10}$ and $R_{11}$ then constitute a voltage divider against the capacitor $C_{20}$, which is given a value which determines the desired period of time before the pulse generator circuit and via the diode $D_5$ disconnects the astable multivibrator. If the signal on $A_1$ is low, the outputs of the gates $A_3$–$A_6$ also go to low. The duration of the disconnection is determined by the capacitor $C_{20}$ via the resistors $R_7$ and $R_8$. After a certain time the input of the inverting amplifier $A_2$ also goes to low, and its output goes to high, such that the multivibrator again is trigged. It is, however, also possible to realize the safety functions in other ways by means of prior art, and the circuit here shown is intended purely as an example of the practical embodiment of the converter according to the invention, and shall not limit the scope of the invention in any sense.

The essential point of the converter according to the invention is that the resonant capacitor $C_1$ which in the embodiment in FIG. 5 is realized as a parallel circuit of nine capacitors $C_{1a}$–$C_{1i}$ (not shown), only operates as a resonant capacitor during a half-period of the frequency. The second half-period of the resonant frequency used for refilling the resonant tank, i.e. the inductor $L_1$, is provided via the capacitor $C_3$ by the discharge of $C_1$, In this connection it may be mentioned that it is well-known in the art that fly-back oscillators tend to give asymmetrical frequency behaviour by energy being drawn from the resonant tank already in the first flyback such that the next half-cycle receives a lower energy content. In order that the transformer T shall operate as a symmetrically working load, the resonant capacitor $C_1$ in FIG. 2 hence must receive a greater charge during the second half-period. This is achieved by the already existing charge in the capacitor $C_3$ being connected in series with the inductor L via diode $D_2$ and at a voltage level identical to that of the first half-cycle. By correct dimensioning of the resonant capacitor $C_3$ and suitable supply voltage U the transformer will be fed the same amount of energy in both half-cycles. There is, however, provided a symmetrization of the energy in each half-cycle of the resonance. Together with the use of an air gap in the transformer T, this makes the resonator provide an approximately perfect sinusoidal voltage without the transformer's primary winding P being biased by a DC component.

By correctly chosen values of the inductance of the inductor L and the impedance of the transformer T as well as correct capacitance values for the capacitors $C_1$ and $C_3$ and suitable supply voltage U, it is possible to achieve a very high efficiency as the switching losses are completely eliminated and the transistor Q only works with a fraction of the current of the circuit due to the phase shift between current and voltage in the inductive components. The transistor Q can in reality be regarded as a voltage switch which sets the resonance circuit to zero in relation to the positive and negative cycles of the resonance. Hence the transistor eliminates the resonator's tendency to relaxation and maintains the given frequency, while current mainly is taken up by the inductor L when the transistor Q is not conducting. This may also be achieved by individual adaption of the air gap used in the transformer T to the characteristic of the provided load $R_G$. The air gap, as best seen in FIG. 6a may hence be used actively for controlling the energy drain of the inductor L and the capacitor $C_1$. A correct dimensioning of the transformer T and the air gap used may by full short-circuiting of $S_1$ bring the resonator to full resonance within the frequency range determined by the transistor Q.

Finally it must be mentioned that it will be obvious to a person skilled in the art that the pulse generator appropriately also may be realized in another manner than as an astable multivibrator, as the latter for instance may be replaced by a digital frequency synthesizer. When using an astable multivibrator, the frequency will only be controllable within 10–15%. A digital frequency synthesizer may drive the converter according to the present invention over a frequency range which stretches from the AF domain and to 100 MHz and beyond, while the generated frequency easily may be controlled over an octave band or more. Then the converter may also be used in HF and VHF applications where high, stable and symmetrisized resonance voltages are required. Further, it is obvious that all components which are included in the pulse generator circuit, also the Schmitt trigger gates $A_1$–$A_6$ and also the transistor Q, may advantageously be integrated on a single chip. With the frequency converter according to the present invention the loss is limited to losses in the transformer, the pulse generator circuit, the energy dissipation in the resonant inductor and in the rectifier bridge at the input. The total losses may thus be kept to 5% or less, such that in the practical embodiment of the converter according to the invention achieves an efficiency in the order of 97%.

I claim:

1. Frequency-modulated converter with series-parallel resonance, particularly for driving any ohmic or inductive load ($R_G$), including gas discharge tubes, wherein a commutating switch (Q) in the form of a transistor is provided connected in series between the negative electrode of a direct voltage source and a first terminal of an inductor (L), wherein a pulse generator circuit between the voltage source and control electrode of the transistor (Q) is provided and wherein the second terminal of the inductor (L) is connected to a primary winding (P) of a transformer (T), and the frequency modulated converter comprises a first series resonance capacitor ($C_1$) and a rectifier diode ($D_2$) provided in a first and second parallel branch respectively between the charge emitting and the charge receiving electrode of the transistor (Q), a second parallel resonance capacitator ($C_3$) provided across the electrodes of the voltage source and additionally providing a smoothing capacitance for the voltage source, said second capacitor ($C_3$) being connected in series with the inductor (L) via the diode ($D_2$); wherein the transistor (Q) is in high ohmic state initiating another series-parallel resonance when switched to the high ohmic mode, the relationship between the inductor voltage $U_L$ and the capacitance of capacitor ($C_1$) determining the series resonance frequency of a first half-cycle, the inductor voltage $U_L$ and the capacitance of the capacitor ($C_3$) determining the parallel resonance frequency of a second half-cycle, each half-cycle of the resonant period being kept in time by the transistor (Q) in the high ohmic state, the transformer (T), the inductor (L) and the capacitors ($C_1$, $C_3$) thus constituting an RCL resonator operating in series-parallel to the transistor, the quality factor of the resonator being determined by the relationship between the inductor voltage $U_L$ or the capacitor voltage $U_{C1}$ and $U_{C2}$ respectively and the supply voltage U, and that the load ($R_G$) being connected between the terminals of a first secondary winding ($S_1$) in the transformer (T), such that the load ($R_G$) is connected in series with the inductor (L) consuming energy in each half-cycle of the resonance period from both the inductor and the direct voltage source, the transistor thus operating in series with the voltage source in the first half-cycle and in parallel with the voltage source in the second half-cycle, all the time carrying a fraction of the total energy consumed by the load $R_G$, and wherein for driving hot cathode gas discharge tubes, the terminals of the first secondary winding ($S_1$) is connected to a capacitor ($C_6$) via the electrodes ($K_1$, $K_2$) of the gas discharge tube, the secondary winding ($S_1$) and the capacitor ($C_6$) being adapted to the resonant frequency of the transformer (T) in the heated state of electrodes ($K_1$, $K_2$).

2. Frequency-modulated converter according to claim 1, wherein the transistor (Q) is a MOS-field effect transistor with an integral free running diode, whereby the rectifier diode ($D_2$) in the second parallel branch is eliminated.

3. Frequency-modulated converter according to claim 1, wherein the pulse generator circuit comprises an astable multivibrator.

4. Frequency-modulated converter according to claim 1, wherein the pulse generator circuits comprises a digital frequency synthesizer.

5. Frequency-modulated converter according to claim 1, wherein the impedance of the secondary winding ($S_1$) of the transformer (T) is tuned to the quality factor of the resonator at nominal load ($R_G$).

6. Frequency-modulated converter according to claim 5, wherein the load ($R_G$) is balanced with a compensating load if the instantaneous value of the load ($R_G$) is less than the nominal load.

7. Frequency-modulated converter according to claim 6, wherein for balancing the load ($R_G$) a rectifier bridge ($B_1$) is provided between the terminals of a second secondary winding ($S_2$) of the transformer, the rectifier bridge ($B_1$) being connected between the electrodes of the voltage source such that the impedance of the primary winding (P) of the transformer (T) lies below a given maximum value.

8. Frequency-modulated converter according to claim 1, wherein the capacitor ($C_1$) limits the voltage of the counterinduction pulse generated by the inductor (L) over the transistor (Q).

9. Frequency-modulated converter according to claim 8, wherein the capacitor ($C_3$) has a capacitance which is several times greater than the capacitance of the capacitor ($C_1$) and further is used for smoothing the supply voltage U.

10. Frequency-modulated converter according to claim 10, wherein the electrode operating as the cathode ($K_1$, $K_2$) is further connected to one of the terminals of a third secondary finding ($S_3$) of the transformer (T).

11. A frequency-modulated converter with series-parallel resonance, particularly for driving any ohmic or inductive load ($R_G$), including gas discharge tubes, wherein a commutating voltage switch (Q) in the form of a transistor is connected in series between the negative electrode of a direct voltage source and a first terminal of an inductor (L,P), wherein a pulse generator circuit is provided between the voltage source and a control electrode of the transistor (Q) with a transformer (T), and further comprising:

a first capacitor ($C_1$) and a rectifier diode ($D_2$) provided in a first and second parallel branch respectively between the charge emitting and the charge receiving electrode of the transistor (Q);

a second capacitor ($C_3$) provided across the electrodes of the voltage source, said second capacitor ($C_3$) being connected in series with the inductor (L) via the diode ($D_2$);

said first capacitor ($C_1$) and said inductor (L) together forming a series resonance circuit, the relationship between the inductor voltage $U_L$ and the capacitance of the first capacitor ($C_1$) determining the series resonance frequency of a first half-cycle;

said second capacitor ($C_3$) and said inductor L together form a parallel resonance circuit, the relationship between inductor voltage $U_L$ and the capacitance of the second capacitor ($C_3$) determining the parallel resonance frequency of a second half-cycle, the capacitor ($C_3$) having a capacitance which is several times greater than that of the capacitor ($C_1$), that said transistor (Q) being in a high ohmic state during both the series and parallel resonance mode;

said diode ($D_2$) acting as an impedance selector between the capacitors ($C_1$, $C_3$) to maintain the correct current flow in the transformer (T) and the load ($R_G$) is conducting in the parallel resonance mode, charging the capacitor ($C_3$) above the voltage source level, before the transistor (Q) is switched into a low ohmic state and completes the parallel resonance mode and then initiates another series-parallel resonance when switched into the high ohmic state, each half-cycle of the resonant period being kept in time by the switching of the transistor (Q) into the high ohmic state, the transformer (T), the inductor (L), and the capacitors ($C_1$, $C_3$) thus constituting a RCL resonator operating in series-parallel to the transistor (Q), the quality factor of the resonator being determined by the relationship between the inductor voltage $U_L$ and the capacitor impedances $Z_{C1}$ and $Z_{C3}$ respectively and the supply voltage U, and said load ($R_G$) being connected between the terminals of a first secondary winding ($S_1$) in the transformer (T), such that the load ($R_G$) is connected in series with the inductor (L,P) consuming energy in each half-cycle of the resonance period from both the conductor and the direct voltage source, the transistor (Q) thus operating as a commutating voltage switch in series with the voltage source in the first half-cycle and in parallel with the voltage source in the second half-cycle, all the time carrying a fraction of the total energy consumed by the load ($R_G$).

12. The converter according to claim 11, wherein the transistor (Q) is a MOS-field effect transistor with an integral free running diode, whereby the rectifier diode ($D_2$) in the second parallel branch is eliminated.

13. The converter according to claim 11, wherein the pulse generator circuit comprises a digital frequency synthesizer.

14. The converter according to claim 11, wherein the impedance of the secondary winding ($S_1$) of the transformer (T) is tuned to the quality factor of the resonator at nominal load ($R_G$).

15. The converter according to claim 15 wherein the load ($R_G$) is balanced with a compensating load if the instantaneous value of the load ($R_G$) is less than the nominal load.

16. The converter according to claim 15, wherein for balancing the load ($R_G$) a rectifier bridge ($B_1$) is provided between the terminals of a second secondary winding ($S_2$) of the transformer, the rectifier bridge ($B_1$) being connected between the electrodes of the voltage source such that the impedance of the primary winding (P) of the transformer (T) lies below a given maximum value.

17. The converter according to claim 11, wherein the capacitor ($C_1$) limits the voltage of the counterinduction pulse generated by the inductor (L) over the transistor (Q).

18. The converter according to claim 17, wherein the capacitor ($C_3$) is used for smoothing the supply voltage U.

19. The converter according to claim 11, wherein for driving hot cathode gas discharge tubes, the terminals of the first secondary winding ($S_1$) is connected to a capacitor ($C_6$) via the electrodes ($K_1$, $K_2$) of the gas discharge tube, the secondary winding ($S_1$) and the capacitor ($C_6$) being adapted to the resonant frequency of the transformer (T) in the heated state of electrodes ($K_1$, $K_2$).

20. The converter according to claim 19, wherein for driving hot cathode gas discharge tubes, the electrode operating as the cathode ($K_1$, $K_2$) is further connected to one of the terminals of a third secondary winding ($S_3$) of the transformer (T).

\* \* \* \* \*